US010354613B2

(12) United States Patent
Marcu et al.

(10) Patent No.: US 10,354,613 B2
(45) Date of Patent: Jul. 16, 2019

(54) SCALABLE CHROMATIC ADAPTATION

(71) Applicant: Apple Inc., Cupertino, CA (US)

(72) Inventors: Gabriel Marcu, San Jose, CA (US); Kenneth Greenebaum, San Carlos, CA (US); Lu Zhang, Cupertino, CA (US); Jiaying Wu, San Jose, CA (US); Ian Hendry, San Jose, CA (US)

(73) Assignee: Apple Inc., Cupertino, CA (US)

( * ) Notice: Subject to any disclaimer, the term of this patent is extended or adjusted under 35 U.S.C. 154(b) by 60 days.

(21) Appl. No.: 15/621,459

(22) Filed: Jun. 13, 2017

(65) Prior Publication Data

US 2018/0350322 A1 Dec. 6, 2018

Related U.S. Application Data

(60) Provisional application No. 62/514,805, filed on Jun. 3, 2017.

(51) Int. Cl.

| | |
|---|---|
| ***G09G 5/02*** | (2006.01) |
| ***G09G 5/06*** | (2006.01) |
| ***G06T 11/00*** | (2006.01) |
| ***H04N 1/60*** | (2006.01) |
| ***H04N 5/57*** | (2006.01) |
| ***H04N 9/73*** | (2006.01) |

(52) U.S. Cl.

CPC ........... *G09G 5/02* (2013.01); *G09G 2340/06* (2013.01)

(58) Field of Classification Search

USPC ........................................................ 345/589

See application file for complete search history.

(56) References Cited

U.S. PATENT DOCUMENTS

| | | | | |
|---|---|---|---|---|
| 6,912,306 | B1 * | 6/2005 | Nakabayashi | H04N 1/6052 382/167 |
| 9,508,318 | B2 | 11/2016 | Pieper | |
| 9,530,342 | B2 | 12/2016 | Bell | |
| 2007/0081102 | A1 | 4/2007 | Ramanath | |
| 2008/0303918 | A1 | 12/2008 | Keithley | |
| 2011/0050695 | A1 * | 3/2011 | Sullivan | G06T 11/001 345/426 |
| 2012/0081279 | A1 | 4/2012 | Greenebaum | |
| 2013/0093783 | A1 * | 4/2013 | Sullivan | G09G 5/06 345/601 |

(Continued)

*Primary Examiner* — Wesner Sajous

(74) *Attorney, Agent, or Firm* — Blank Rome LLP

(57) ABSTRACT

Scalable color balancing techniques for processing images to be presented on displays are described. One technique includes receiving ambient light color information from an ambient light sensor and input image data to be presented via a display coincident with receiving the ambient light color information. The display may have a first white point at a time prior to receiving the input image data. The technique may include determining a second white point for the display based on the input image data and the ambient light color information. The first and second white points may differ from each other. The technique may also include generating one or more chromatic adaptation transforms (CATs) based on the white points. Output image data may be generated based on applying the one or more CATs to the input image data. The output image data may be presented via the display. Other embodiments are described.

24 Claims, 8 Drawing Sheets

(56) References Cited

U.S. PATENT DOCUMENTS

| | | | | |
|---|---|---|---|---|
| 2016/0180780 | A1* | 6/2016 | Chen | G09G 3/2003 345/207 |
| 2016/0255321 | A1* | 9/2016 | Chen | H04N 9/735 348/223.1 |
| 2016/0358584 | A1* | 12/2016 | Greenebaum | G09G 5/02 |
| 2017/0263174 | A1* | 9/2017 | Chen | G09G 3/2003 |

* cited by examiner

SCALABLE CHROMATIC ADAPTATION

TECHNICAL FIELD

Embodiments described herein relate to color balancing techniques and, more particularly, to color balancing techniques that include a scalable selection of one or more chromatic adaptation transforms (CATs).

BACKGROUND INFORMATION

The chromatic adaptation function of the human visual system allows humans to maintain constant perceived color under different ambient lighting conditions. For example, an object that appears red when illuminated by sunlight may be perceived as red when illuminated by an indoor electric light.

Some displays account for different ambient lighting conditions or the chromatic adaptation of the human visual system. As a result, user experience may be improved by making color shifts imperceptible to a user viewing such a display under different ambient lighting conditions. For example, the white point of a display may appear white to a user in outdoor ambient lighting conditions, and may be adjusted using a chromatic adaptation transform (CAT) to continue to appear white to the user after the user moves to an indoor environment where the user's eyes will adapt to the warmer light produced by indoor light sources.

CATs are able to predict corresponding colors. A pair of corresponding colors consists of a color observed under one illuminant (e.g., direct sunlight, etc.), and another color that has the same appearance when observed under a different illuminant (e.g., artificial indoor light, etc.). This has industrial applicability, for example, in the realm of multiple displays that are receiving the same input image data from a source. For example, in a scenario where a laptop computer and a smartphone receive the same image data from a server over a network and where the laptop's display is observed under a first illuminant and the smartphone's display is observed under a second illuminant, CATs can assist with enabling both displays to maintain a desired uniform appearance even as users' visions are subjected to different ambient lighting conditions. The desired perceived appearance can be constrained according to principles of color constancy.

CATs can be implemented using matrices or look up tables (LUT). A matrix is a rectangular array of numbers, symbols, or expressions that are arranged in rows and columns. Matrices are represented in a same format: an m×n matrix, where m is the number of rows in the matrix, n is the number of columns in the matrix, and each individual item is represented $a_{i,j}$, where maximum i=m and maximum j=n. An exemplary matrix used to implement a CAT is a 3×3 matrix.

An LUT is an array that replaces runtime computation with a simpler array indexing operation. In image processing, an LUT is used to transform input image data into a more desirable output format. Examples of LUTs used to represent a CAT include a one dimensional LUT (1D LUT) and a three dimensional LUT (3D LUT). A 1D LUT usually has an exact output value for a corresponding input value. For example, when a pixel is represented in an RGB (red green blue) color model, a 1D LUT includes an output R value for every input R value, an output G value for every input G value, and an output B value for every input B value. 1D LUTs, however, are limited in that they cannot alter color saturation without affecting contrast or brightness. A 3D LUT, on the other hand, is an LUT that includes a coordinate set of colors. As an example, an RGB coordinate of (0, 0, 448) could be directly transformed to (128, 0, 832) in a 3D LUT. If a 3D LUT had corresponding matches for each coordinate set, the files would be large and difficult for electronic systems to use. Thus, in practice 3D LUTs usually have a set of 17 coordinates on each axis (red, green, and blue) from which other, unknown values are interpolated to various levels of accuracy.

As alluded to above, some non-trivial differences arise when a CAT uses matrices instead of LUTs (or vice versa). For example, an amount of computational resources (e.g., processing power, memory, computation time, etc.) required to process a matrix might be relatively lower than an amount of computational resources required to process an LUT. In addition, some displays may be equipped with electronic components that enable processing matrices but not components that enable processing LUTs (or vice versa). Due to these differences, it may be difficult to achieve a uniform presentation of output image data on multiple devices receiving the same input image data when one or more of these devices is configured to work with matrices but not LUTs (or vice versa). Furthermore, even when a display includes components that enable processing of matrices and LUTs, such a display may engage in wasteful use of computational resources because the display's components may require computational resources for both processing operations.

SUMMARY

Embodiments described herein relate to scalable color balancing techniques for processing image data that will be presented on a display. One embodiment includes a scalable chromatic adaptation (SCA) logic/module receiving ambient light color information from an ambient light sensor and input image data to be presented via a display coincident with receiving the ambient light color information. The SCA logic/module can determine a first white point for the display at a time prior to receiving the input image data. The SCA logic/module may also determine a second white point for the display based on the input image data and the ambient light color information. The first and second white points may differ from each other. The SCA logic/module may generate one or more chromatic adaptation transforms (CATs) using the first and second white points. Next, the SCA logic/module may generate output image data based on applying the one or more CATs to the input image data. The output image data may be presented via the display.

Other features or advantages of the embodiments described herein will be apparent from the accompanying drawings and from the detailed description that follows below.

BRIEF DESCRIPTION OF THE DRAWINGS

Embodiments described herein are illustrated by way of example and not limitation in the figures of the accompanying drawings, in which like references indicate similar features. Furthermore, in the figures some conventional details have been omitted so as not to obscure the inventive concepts described herein.

DETAILED DESCRIPTION

Embodiments described herein are directed to methods, apparatuses, and systems for processing image data that will be presented on at least one display based on scalable chromatic adaptation (SCA). In particular, the embodiments of SCA described herein include an adaptive selection of one or more chromatic adaptation transforms (CATs). Such embodiments can assist with improving the efficient utilization of computational resources (e.g., processing power, memory, computation time, etc.) required for image processing operations based on an intelligent selection of one CAT from a plurality of CATs. This can, in turn, assist with reducing wasted computational resources associated with image processing operations. Additionally, when multiple displays are receiving image data from the same source and one or more of these devices is configured to work with matrices but not LUTs (or vice versa), one or more embodiments of SCA described herein can assist with achieving a uniform presentation of output image data on the multiple devices even though one or more of these devices is configured to work with matrices but not LUTs (or vice versa). In this way, one or more of the embodiments described herein can assist with improving the functionality of computing devices or systems that process and display images. Computer functionality can also be improved by enabling computing devices or systems that use the described image processing techniques for processing images that will be presented on one or more displays to reduce or eliminate wasted computational resources (e.g., memory, processing power, computational time, etc.). Reducing or eliminating wasted computational resources can, for example, improve the processing capabilities of the device or system.

Figure 1:
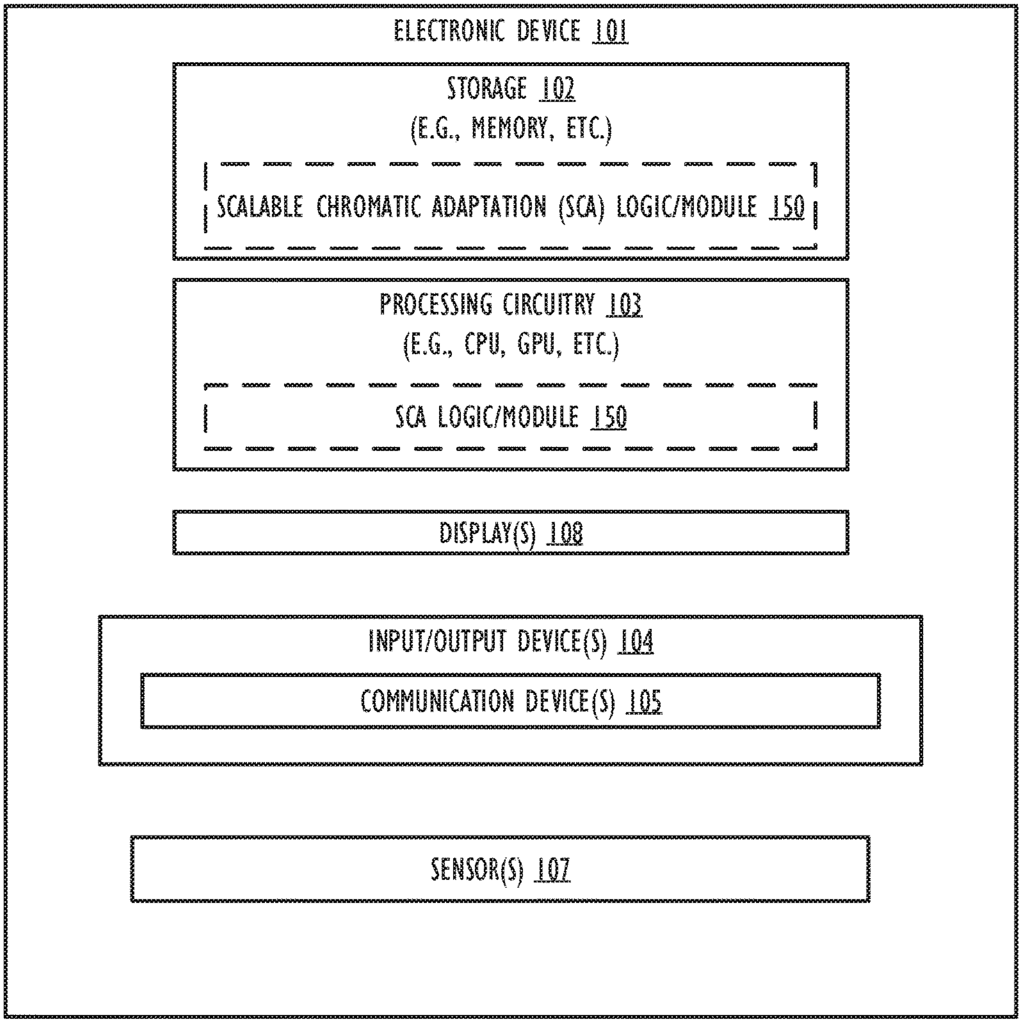
FIG. 1 is a block diagram of an electronic device, which includes electronic components for performing one or more embodiments of a scalable chromatic adaptation (SCA) technique.

Referring now to FIG. 1, which illustrates an electronic device 101 capable of performing a scalable chromatic adaptation (SCA) technique according to one embodiment. As shown, the electronic device 101 includes storage 102, processing circuitry 103 (which may include a scalable chromatic adaptation (SCA) logic/module 150), input/output device(s) 104 (which may include one or more communication devices 105), display(s) 108), and sensor(s) 107. Each of these components is described below.

Examples of the electronic device 101 include, but are not limited to, a smartphone, a media player, a gaming device, a navigation device, a television, a computer monitor, a laptop computer, a tablet computer, a desktop computer, a set-top box, a wireless access points, a wearable computing device, an Internet-of-Things (IoT) device, a vehicle, a micro-console, and other electronic equipment that include one or more displays. It is to be appreciated that each component of the device 101 may be housed together with or may be logically and/or physically separate from one or more other components of the device 101.

As shown in FIG. 1, the electronic device 101 may include one or more displays 108. As is known, a display (e.g., the display 108, etc.) may be used to present visual information and status data and/or may be used to gather user input data. For one embodiment, the display 108 includes an ambient light adaptive display. For some embodiments, the display(s) 108 may include a touch screen that incorporates capacitive touch electrodes or other touch sensor components or may include a display that is not touch-sensitive. The display(s) 108 may include image pixels formed from light-emitting diodes (LEDs), organic light-emitting diodes (OLEDs), plasma cells, electrophoretic displays, electrowetting displays, liquid crystal display (LCD) components, or other suitable image pixel structures. Any suitable type of display technology may be used in forming the display(s) 108.

Referring again to FIG. 1, the electronic device 101 may include circuitry in the form of hardware, software, or a combination of hardware and software, such as storage 102 and processing circuitry 103. The storage 102 may include one or more different types of storage such as hard disk drive storage, nonvolatile memory (e.g., flash memory or other electrically-programmable-read-only memory), volatile memory (e.g., static or dynamic random-access-memory), etc. The storage 102 may store information including sequences of instructions that are executed by the processing circuitry 103 or any other device. For example, executable code and/or data of one or more operating systems (OSs), one or more device drivers, firmware (e.g., input output basic system or BIOS), and/or one or more applications can be loaded into the storage 102 and executed by the processing circuitry 103. The one or more OSs can include any kind of OS. For some embodiments, an SCA logic/module 150 is included as part of the services provided by the OS, as described in further detail below in connection with FIG. 2.

The processing circuitry 103 in the device 101 may be used in controlling the operation of the electronic device 101. The processing circuitry 103 may include or be based on one or more processors, central processing units (CPUs), graphics processing units (GPUs), microprocessors, microcontrollers, digital signal processors (DSPs), baseband processor integrated circuits, image processors, application specific integrated circuits, any other type of processing unit, etc. The processing circuitry 103, which may include a low power multi-core processor socket such as an ultra-low voltage processor, and can act as a main processing unit and central hub for communication with the various components of the electronic device 101. In such a scenario, the processing circuitry 103 can be implemented as a system-on-chip (SoC) integrated circuit (IC).

As shown in FIG. 1, the device 101 includes an SCA logic/module 150 that may reside, completely or at least partially, in the storage 102 and/or in the processing circuitry 103. For a specific embodiment, the SCA logic/module 150 enables the one or more techniques of SCA, as described herein. In this way, the SCA logic/module 150 can assist with improving the efficient utilization of computational resources (e.g., processing power, memory, computation time, etc.) required for image processing based on an intelligent selection of one chromatic adaptation transform (CAT) from a plurality of CATs. This can, in turn, assist with reducing wasted computational resources associated with image processing. Additionally, when multiple displays are receiving image data from the same source and one or more of these devices is configured to work with matrices but not LUTs (or vice versa), the SCA logic/module 150 can assist with achieving a uniform presentation of output image data on the multiple devices even though one or more of these devices is configured to work with matrices but not LUTs (or vice versa). Additional details about the SCA logic/module 150 are provided below in connection with at least FIGS. 1-4C. Additional details about the SCA logic/module 150 are provided below in connection with at least FIGS. 1-4C.

For some embodiments, the processing circuitry 103 may be configured (e.g., to execute software stored in the processing circuitry 103 itself or on the storage 102, etc.) to provide one or more functionalities of the electronic device 101. Such software includes, but is not limited to, software for internet browsing applications, email applications, media playback applications, operating system functions, software for capturing and processing images, software implementing functions associated with gathering and processing sensor data, and software that makes adjustments to display brightness and touch sensor functionality. The processing circuitry 103 may be configured (e.g., to execute software stored in the processing circuitry 103 itself or on the storage 102, etc.) to enable the electronic device 101 to support interactions with external equipment by, for example, implementing one or more communications protocols. Such communications protocols include, but are not limited to, internet protocols, wireless local area network protocols (e.g., IEEE 802.11 protocols-sometimes referred to as WIFI®), and protocols for other short-range wireless communications links such as the BLUETOOTH® protocol.

Input/output device(s) 104 may also be included in the electronic device 101. The device(s) 104 can be used to allow input to be supplied to electronic device 101 from an external source (e.g., a user, another electronic device, etc.) and to allow output to be provided from electronic device 101 to an external source (e.g., a user, another electronic device, etc.). Input device(s) 104 may include a mouse, a touch pad, a touch sensitive screen (which may be integrated with the display(s) 108), a pointer device such as a stylus, and/or a keyboard (e.g., physical keyboard or a virtual keyboard displayed as part of a touch sensitive screen). For example, input device 104 may include a touch screen controller coupled to a touch screen. The touch screen and touch screen controller can, for example, detect contact and movement or a break thereof using any of a plurality of touch sensitivity technologies, including but not limited to capacitive, resistive, infrared, and surface acoustic wave technologies, as well as other proximity sensor arrays or other elements for determining one or more points of contact with the touch screen. Output devices 104 may include an audio device. The audio device may include a speaker and/or a microphone to facilitate voice-enabled functions, such as voice recognition, voice replication, digital recording, and/or telephony functions. Other input/output device(s) 104 may further include universal serial bus (USB) port(s), parallel port(s), serial port(s), a printer, a network interface, a bus bridge (e.g., a PCI-PCI bridge), or a combination thereof. The devices 104 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips.

As shown in FIG. 1, the input/output device(s) 104 may also include wired and wireless communications device(s) 105. The communications device(s) 105 may include radio frequency (RF) transceiver circuitry formed from one or more integrated circuits, power amplifier circuitry, low-noise input amplifiers, passive RF components, one or more antennas, and other circuitry for handling RF wireless signals. Wireless signals can also be sent using light (e.g., using infrared communications). The devices 104, circuitry 103, and/or storage 102 may be controlled by one or more embedded controllers (not shown), depending on the configuration/design of the device 101.

The electronic device 101 may, in some embodiments, include one or more sensors 107. The sensor(s) 107 may include an ambient light sensor for gathering information on ambient light, proximity sensor components (e.g., light-based proximity sensors and/or proximity sensors based on other structures), accelerometers, gyroscopes, magnetic sensors, and other sensors. The sensors 107 may, for example, include one or more microelectromechanical systems (MEMS) sensors. Depending on the implementation, the sensor(s) 107 may be coupled to the other components of the electronic device 101 via a sensor hub (not shown).

For one embodiment, each of the display(s) 108 of FIG. 1 includes a pixel array, column driver circuitry, gate driver circuitry, and any other circuitry that may be used in displaying images for a user of electronic device 101. The column driver circuitry is responsible for driving data signals (analog voltages) onto data lines of the pixel array and the gate driver circuitry is responsible for driving gate line signals onto gate lines of the pixel array. Using the data lines and gate lines, display pixels on the pixel array may be configured to display images on the display(s) 108 for a user. The column driver circuitry may be implemented using one or more column driver integrated circuits that are mounted on the display substrate or using column driver circuits mounted on other substrates. The gate driver circuitry may be implemented using thin-film transistor circuitry on a display substrate such as a glass or plastic display substrate or may be implemented using integrated circuits that are mounted on the display substrate or attached to the display substrate by a flexible printed circuit or other connecting layer.

During operation of the electronic device 101, the processing circuitry 103 may be configured to generate output image data for display on the display(s) 108. This output image data may be provided to display control circuitry such as, for example, a timing controller (not shown) associated with the processing circuitry 103. The timing controller may provide the output image data to the column driver circuitry using paths that provide coupling between the timing controller and the display(s) 108. The column driver circuitry may receive the output image data from the timing controller. Using digital-to-analog converter circuitry within the column driver circuitry, the column driver circuitry may provide corresponding analog output signals on the data lines running along the columns of display pixels of the pixel array.

Each pixel in the display(s) 108 may, if desired, be a color pixel such as a red (R) pixel, a green (G) pixel, a blue (B) pixel, a white (W) pixel, or a pixel of another color. For example, the pixels in the display(s) 108 may include a pattern of cyan, magenta, yellow and black (CMYK) pixels, or may include any other suitable pattern of colors. Color pixels may include color filter elements that transmit specified colors and may be formed from emissive elements that emit the light of a given color. The processing circuitry 103, together with associated thin-film transistor circuitry (not shown) of the display(s) 108, may be configured to produce signals such as data signals and gate line signals for operating pixels in the display(s) 108 (e.g., turning pixels on and off, adjusting the intensity of pixels, etc.). During operation, the processing circuitry 103 may control the values of the data signals and gate signals to control the light intensity associated with each of the display pixels and to display images on display(s) 108. The processing circuitry 103 may be configured to obtain red, green, and blue pixel values (sometimes referred to as RGB values or RGB data) corresponding to the color to be displayed by a given pixel. The RGB values may be converted into analog display signals for controlling the brightness of each pixel. The RGB values may be integers with values ranging from a first integer to a second, higher integer that correspond to the desired pixel intensity of each pixel (e.g., integers with values ranging from 0 to 255, etc.). For example, an RGB value of 0 may result in an "off" pixel, whereas an RGB value of 255 may result in a pixel operating at a maximum available power. It should be appreciated that the immediately preceding examples are directed to scenarios where each color channel has eight bits dedicated to it. Alternative embodiments may employ greater or fewer bits per color channel. For example, each color may, if desired, have six bits dedicated to it. With this type of configuration, RGB values may be a set of integers ranging from 0 to 64.

For some embodiments, the processing circuitry 103 may be configured to adaptively adjust the output from the display(s) 108 based on a source display's white point, on ambient lighting conditions, and/or user context information. In adjusting the output from the display(s) 108, the processing circuitry 103 may take into account the chromatic adaptation function of the human visual system. This may include, for example, determining characteristics of the light that the user's eyes are exposed to. With regard to the source display's white point, the processing circuitry may extract the source display's white point information from metadata associated with the input image data. Additional details about a source display's white point is provided below in connection with FIGS. 2-4C.

Furthermore, and as shown in FIG. 1, the processing circuitry 103 may gather information on ambient lighting conditions and/or user context information from sensor(s) 107 and/or the input/output device(s) 104 to assist with adaptively determining how to adjust display light at the destination display(s) 108. For example, the processing circuitry 103 may gather light information from one or more light sensors (e.g., an ambient light sensor, a light meter, a color meter, a color temperature meter, and/or other light sensor), time information from a clock, calendar, and/or other time source, location information from location detection circuitry (e.g., Global Positioning System receiver circuitry, IEEE 802.11 transceiver circuitry, or other location detection circuitry), user input information from a user input device such as a touchscreen (e.g., touchscreen display(s) 108) or keyboard, etc.

Light sensors (e.g., color light sensors, cameras, etc.) may, if desired, be distributed at different locations on the electronic device 101 to detect light from different directions. Other sensors such as an accelerometer and/or gyroscope may be used to determine how to weight the sensor data from the different light sensors. For example, if the gyroscope sensor data indicates that electronic device 101 is placed flat on a table with display(s) 108 facing up, the electronic device 101 may determine that light sensor data gathered by rear light sensors (e.g., on a back surface of electronic device 101) should not be used.

Figure 2:
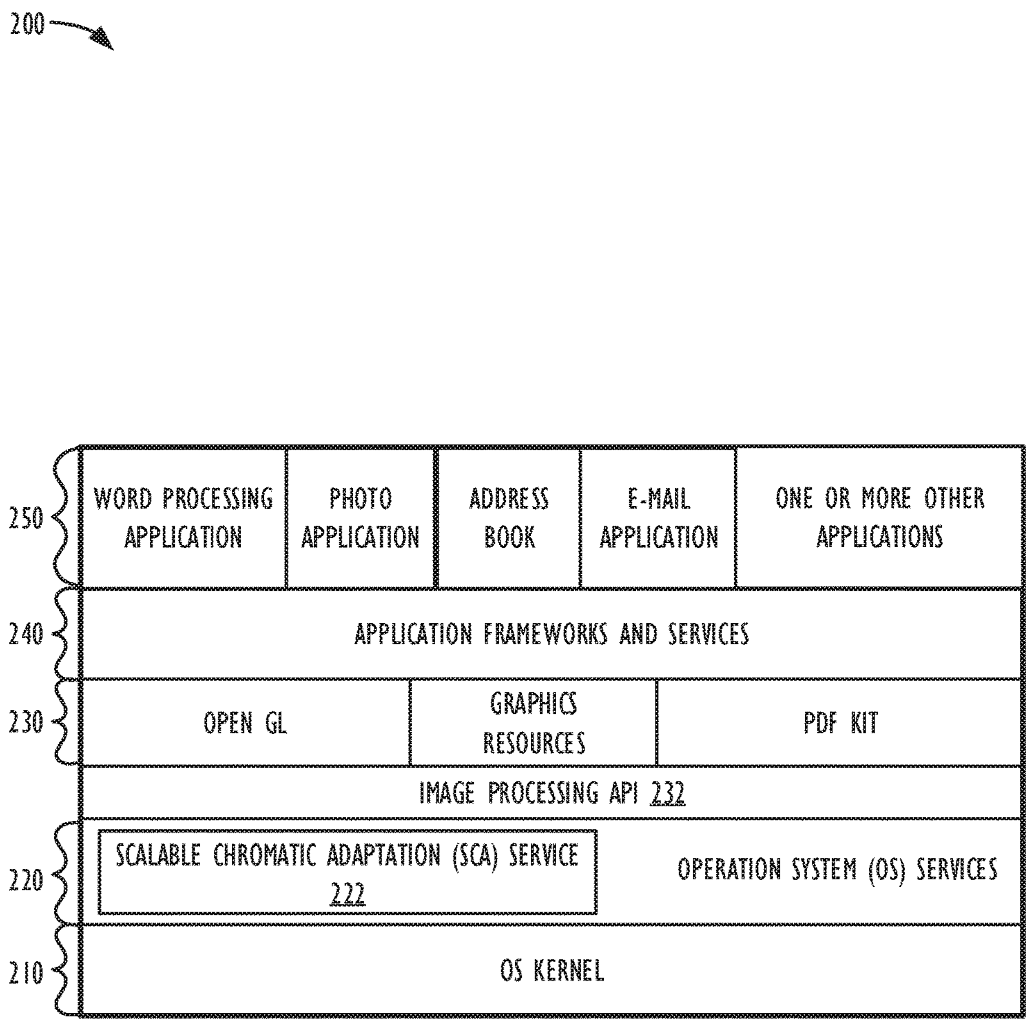
FIG. 2 illustrates one embodiment of a software stack for the electronic device of FIG. 1.

Referring now to FIG. 2, which illustrates one embodiment of a software stack 200 for the electronic device 101 of FIG. 1. Portions of the software stack 200 can be stored in the storage 102 and/or the processing circuitry 103 of FIG. 1. The software stack 200 includes an operating system (OS) kernel layer 210, an OS services layer 220, a resource layer 230, an application frameworks and services layer 240, and an application layer 250. These layers are illustrative and have certain features omitted. For example, software and firmware below the OS kernel layer 210 are not shown. In general, software elements shown in one layer use the resources from the layers positioned below and provide services to the layers positioned above. However, in practice, some components of a particular software element may not behave entirely in this manner.

The OS kernel layer 210 provides core OS functions in a highly protected environment. Above the OS kernel layer 210, the OS services layer 220 extends functional services to the layers above it. The OS service layer 220 for the operating system of a computer offers a number of functional services. For some embodiments, the OS services layer 220 has an SCA service 222 for processing image data according to the one or more of the embodiments described herein.

The resource layer 230 is above the OS services layer and shows graphics resources, such as Open Graphics Library ("OpenGL"), Apple Computer's PDF kit, etc. OpenGL, which is developed by Silicon Graphics, Inc., is a specification for various graphics functions. OPENGL® is a trademark of Silicon Graphics, Inc. An image processing application programming interface (API) 232 is positioned between the resource layer 230 and the SCA service 222 in the OS Service Layer 220. Layer 240 is an amalgamation of functions typically expressed as two layers: applications frameworks and application services. This layer 240 provides high-level and often functional support for application programs that reside in the highest layer shown here as application layer 250.

The SCA service 222 leverages the processing circuitry 103 (e.g., one or more CPUs, one or more GPUs, etc.) of the electronic device 101 to perform image processing (e.g., one or more embodiments of SCA as described herein, etc.). The SCA service 222 can also use OpenGL to leverage the processing circuitry 103 of the electronic device 101. In turn, the API 232 makes the processed image data of the SCA service 222 available to the various application programs in the application layer 250. In this way, the image data can be processed using the SCA service 222 in the OS services layer 220 and hardware (e.g., the processing circuitry 103, etc.) of the device 101. Image processing operations based on one or more techniques of SCA described herein can be focused in the OS services layer 220 to assist with improving efficient utilization of computational resources and/or with achieving a uniform presentation of output image data on one or more displays. In addition, the processed image data can be made available to various applications that in the application layer 250, such as word processing applications, photo applications, address book applications, e-mail applications, or any other application that may use images. Moreover, the image processing techniques disclosed herein may be applicable to video as well, so that applications that use video may also benefit from the techniques disclosed.

Figure 3:
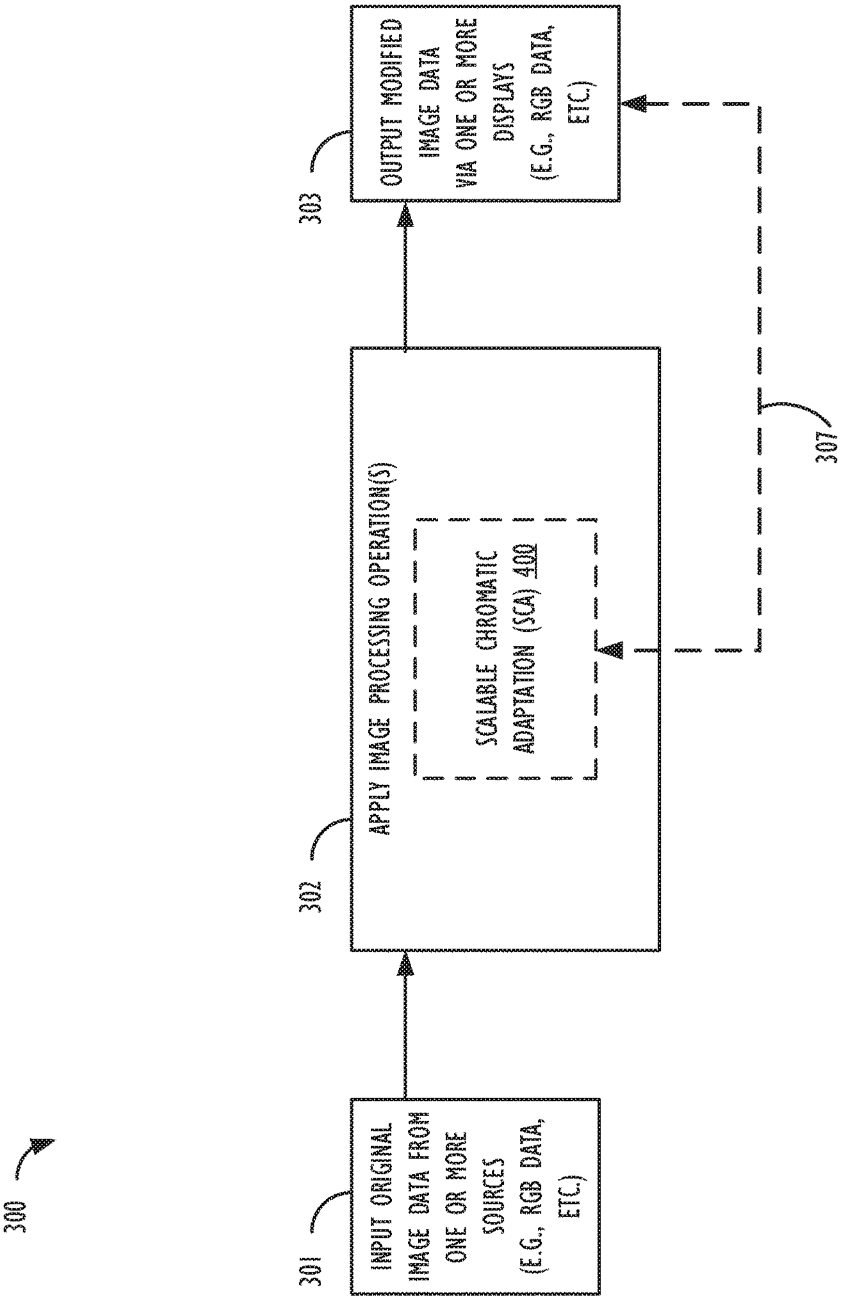
FIG. 3 illustrates an image processing pipeline for performing one or more embodiments of an SCA technique.

Referring now to FIG. 3, which illustrates an image processing pipeline 300 for performing one or more techniques of SCA according to an embodiment. The pipeline 300 can be performed by one or more components of electronic device 101 of FIG. 1 (e.g., the SCA logic/module 150, the display(s) 108, the input/output devices 104, the sensor(s) 107, etc.). The pipeline 300 is illustrated in a plurality of stages 301, 302, and 303 for processing input image data from one or more sources and outputting processed/modified image data for presentation on at least one destination display (e.g., display(s) 108). Sources of input image data include, but are not limited to, an imaging device, a server computer system, memory, a source display device, another electronic device, etc. In an initial stage 301, input image data is received as discussed previously. The input image data may be presented in the RGB color model, but other color models may be used. Examples of such color models include, but are not limited to, CIELAB color model, CIELUV color model, CMYK color model, Lab color model, HSV color model, and the HSL color model.

Although not shown, it is to be appreciated the stage 301 includes obtaining and analyzing metadata associated the input image data. The analysis can identify, for example, attributes of the input image data and attributes of the source of the input image data. The metadata can include information about how the input image data was obtained. Such information includes, but is not limited to, white point information, image capture device name, image capture device manufacturer, shutter speed, aperture, white balance, exposure compensation, metering setting, ISO setting, date, and time. The metadata can, for example, be in an Exchangeable Image File (EXIF) format, IPTC format, IPTC-IIM format, XMP format, or any other format.

The pipeline 300 also includes a stage 302 which receives the input image data (and/or associated metadata) from stage 301. At the stage 302, one or more image processing operations are performed on the received image data. For one embodiment, the stage 302 includes performing an SCA process 400 and/or a feedback process 307 as described more fully below with respect to FIGS. 4A-4D. Other processes may also be performed at stage 302. Examples include, but are not limited to, a black subtraction process, a demosaic (de-Bayer) process, a noise reduction process, an image scaling process, a gamma correction process, an image enhancement process, a color space conversion process, a chroma subsampling process, a framerate conversion process, an image compression/video compression process, and a computer data storage/data transmission process. As described in further detail below, the SCA logic/module 150 of FIG. 1 may perform the SCA process 400.

For an embodiment, and still with regard to FIG. 3, the SCA process 400 may be performed with regard to image processing capabilities of circuitry associated with destination display(s) 108, constraints affecting image processing operations to be performed by circuitry associated with destination display(s) 108, and/or user context conditions. The feedback process 307 may be used to acquire the image processing capabilities, constraints affecting image processing operations, and/or user context conditions. For the image processing capabilities, the SCA logic/module 150 or SCA service module/component 222 may determine a number of displays that are to receive the input image data, as well as the image processing capabilities of each display's associated circuitry. For one example, the SCA logic/module 150 may determine that a first one of the displays 108 is capable of processing image data with matrices but incapable of processing image data with LUTs, a second one of the displays 108 is capable of processing image data with LUTs but incapable of processing image data with matrices, a third one of the displays 108 is capable of processing image data with LUTs and matrices. For a further example, the second display and/or the third display may be capable of processing one or more of a 3D LUT and one or more 1D LUTs.

Determining image processing capabilities may be important because a matrix (e.g., a three-by-three matrix) can be used to implement one or more image processing operations in a relatively more efficient or desirable manner than an LUT (or vice versa). For one example, three 1D LUTs can assist with performing a gamma change process, black level adaptation, backlight compensation, backlight white point compensation, or display calibration. For another example, a three-by-three matrix can assist with performing color space conversion, gamut conversion, scaling for dynamic range, and backlight white point compensation. In scenarios, where one or more of these image processing operations are needed, the SCA techniques described herein will consider these image processing operations as image processing capabilities associated with the destination display(s) 108.

The SCA logic/module 150 may also determine constraints affecting image processing operations using the feedback process 307. These constraints include, but are not limited to, availability of computational resources for performing image processing operations (e.g., hardware, software, firmware, etc.), an amount of computational resources required to perform image processing operations (e.g., memory, processing power, etc.), timing constraints associated with presenting image data and/or performing image processing operations, other image processing operations that need to performed given that some operations can be performed more efficiently or in a relatively more desirable by a matrix than an LUT (or vice versa), and a desired or an acceptable accuracy of image processing results (e.g., based on a Euclidean distance in an RGB color space, a delta E or ΔE distance in the Lab color space, any other difference or distance between two colors in a color space, etc.). Constraints also include an amount of time and/or computational resources required to update a matrix as opposed to an LUT (or vice versa), as described below in connection with FIG. 4B.

As alluded to above, the SCA logic/module 150 can acquire user context conditions using the feedback process 307. These user context conditions comprise one or more ambient light conditions that affect how a human eye perceives displayed image data. The conditions may also comprise user input and/or preference information describing how a specific user of the device 101 that is performing the pipeline 300 will like image data to be displayed. One way to acquire these user context conditions includes use of sensor(s) 107 and/or the input/output device(s) 104 of FIG. 1, as described above in connection with FIG. 1. Based on the acquired data from process 307, the SCA process 400 may be performed. Additional details about the SCA process 400 are provided below in connection with FIGS. 4A-4D. After the SCA process 400, output image data is presented via one or more destination displays (e.g., the display(s) 108 of FIG. 1, etc.).

Figure 4A:
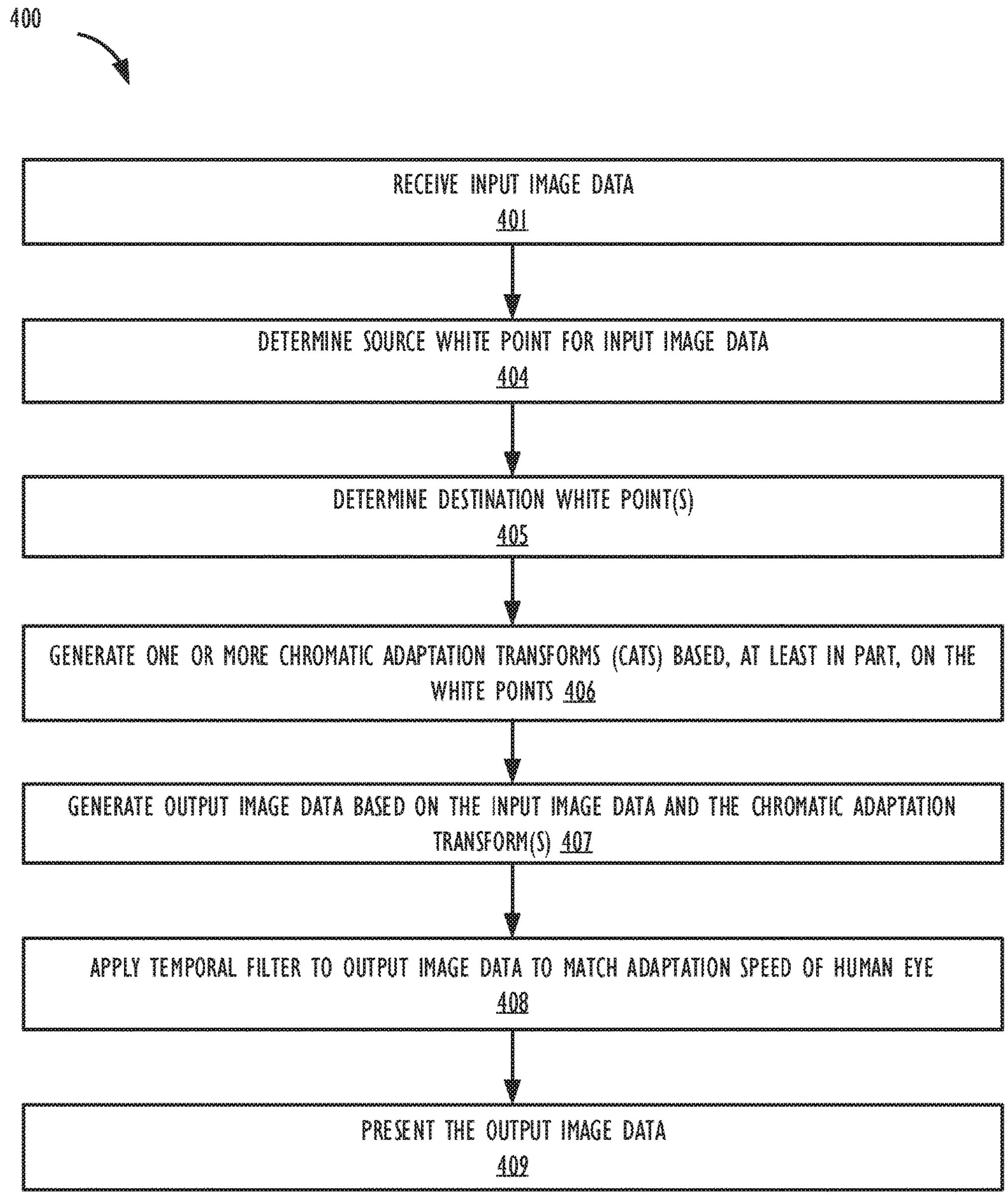
FIG. 4A is a flowchart illustrating one embodiment of an SCA technique.

Referring now to FIG. 4A, which is a flowchart illustrating one embodiment of the SCA process 400 shown in FIG. 3. The SCA process 400 may be performed by one or more components of the device 101 shown in FIG. 1 (e.g., the SCA logic/module 150, etc.) and/or one or more components of the software stack 200 shown in FIG. 2 (e.g., the SCA service 222, etc.). For brevity, the process 400 will be described herein as being performed by the SCA logic/module 150.

The SCA process 400 begins at a block 401, where input image data is received by the SCA logic/module 150. For one embodiment, the received input image data is represented in a device dependent color space (e.g., as RGB data, etc.). For brevity, an example of the input image data as input RGB data is used to describe the embodiments herein. It is to be appreciated that the input image data may be represented in any device dependent color space.

Next, at a block 404, a source white point for the input image data is determined. As used herein, a "source white point" and its variations refer to a set of chromaticity values that represent color produced by a display coupled to the source of the input image data when the source's display is generating all available display colors at full power. The source white point can, for example, be defined by a set of chromaticity values associated with a reference white (e.g., a white produced by a standard display, a white associated with a standard illuminant such as the D65 illuminant of the International Commission on Illumination (CIE), a white produced at the center of a display). CIE may be a trademark the International Commission on Illumination. In some scenarios, it is assumed that the source white point is known. For example, the source white point may be included as part of metadata associated with the input image data. For this example, the SCA logic/module 150 determines (e.g., extracts, interpolates, generates, etc.) the source white point from the metadata.

At block 405 of the SCA process 400, a destination white point is determined for each of the one or more destination displays that are to receive and present the image data. As used herein, a "destination white point" and its variations refer to a set of chromaticity values that represent color produced by a given display when the display is generating all available display colors at full power, where the set of chromaticity values has been adjusted to account for one or more ambient lighting conditions and the chromatic adaptation of the human visual system. Determining a destination white point can, for example, be based on one or more techniques described in U.S. Pat. No. 9,478,157 by Wu, et al., which issued Oct. 25, 2016 and is hereby incorporated by reference in its entirety. For an embodiment, each of the source and destination white points are not static values and can change over time. In other embodiments, one or both of the source and destination white points may be static values.

The SCA process 400 also includes a block 406. Here, one or more chromatic adaptation transforms (CATs) are generated based on the source and destination white points. As used herein, a "chromatic adaptation transform," a "CAT," and their variants refers to a technique for adapting a destination display's white point to a source display's white point so as to generate an adapted white point for the destination display that can assist with presenting image data uniformly or in a desired manner. For example, the SCA logic/module 150 can generate a first CAT and a second CAT that differs from the first CAT for a single destination display that is to present image data. Each of the first and second CATs in this example may be designed differently so as to produce differing results. That is, application of the first CAT to the destination display's white point may generate a first adapted white point that is different from a second adapted white point. The second adapted white point may be generated based on applying the second CAT to the destination display's white point. One difference in the results may occur, for example, because the first CAT may be designed to generate a less precise adaptation of the destination display's white point to the source display's white point than the second CAT. Another difference may occur, for example, because the first CAT may have been designed to be applied to the destination display's white point in a shorter time than the second CAT. Yet another difference may occur, for example, because the amount of computational resources required to apply the first CAT may be designed to be smaller than the amount of computational resources required to apply the second CAT. In the preceding examples, only two CATs were used. It is, however, to be appreciated that any number of CATs can be generated for a single display. Additional details about CATs are provided below in connection with FIG. 4B.

At a block 407, output image data may be generated based on the input image data and at least one of the CATs. For example, the SCA logic/module 150 may generate output image data by conforming the input image data to the destination display's adapted white point using the CAT(s). The SCA process 400 may also include a block 408 where the SCA logic/module 150 applies a temporal filter to the output image to match an adaptation speed of a human eye. Application of a temporal filter can assist with ensuring that the adjustment of images does not occur too quickly or too slowly relative to the speed at which the user adapts to different lighting conditions. Adjusting display images at controlled intervals in accordance with the timing of chromatic adaptation may ensure that the user does not perceive sharp changes in the display light as the ambient lighting conditions change. Next, at block 409, the SCA logic/module 150 may output the output image data to a destination display's pixel array so that the image is presented.

Figure 4B:
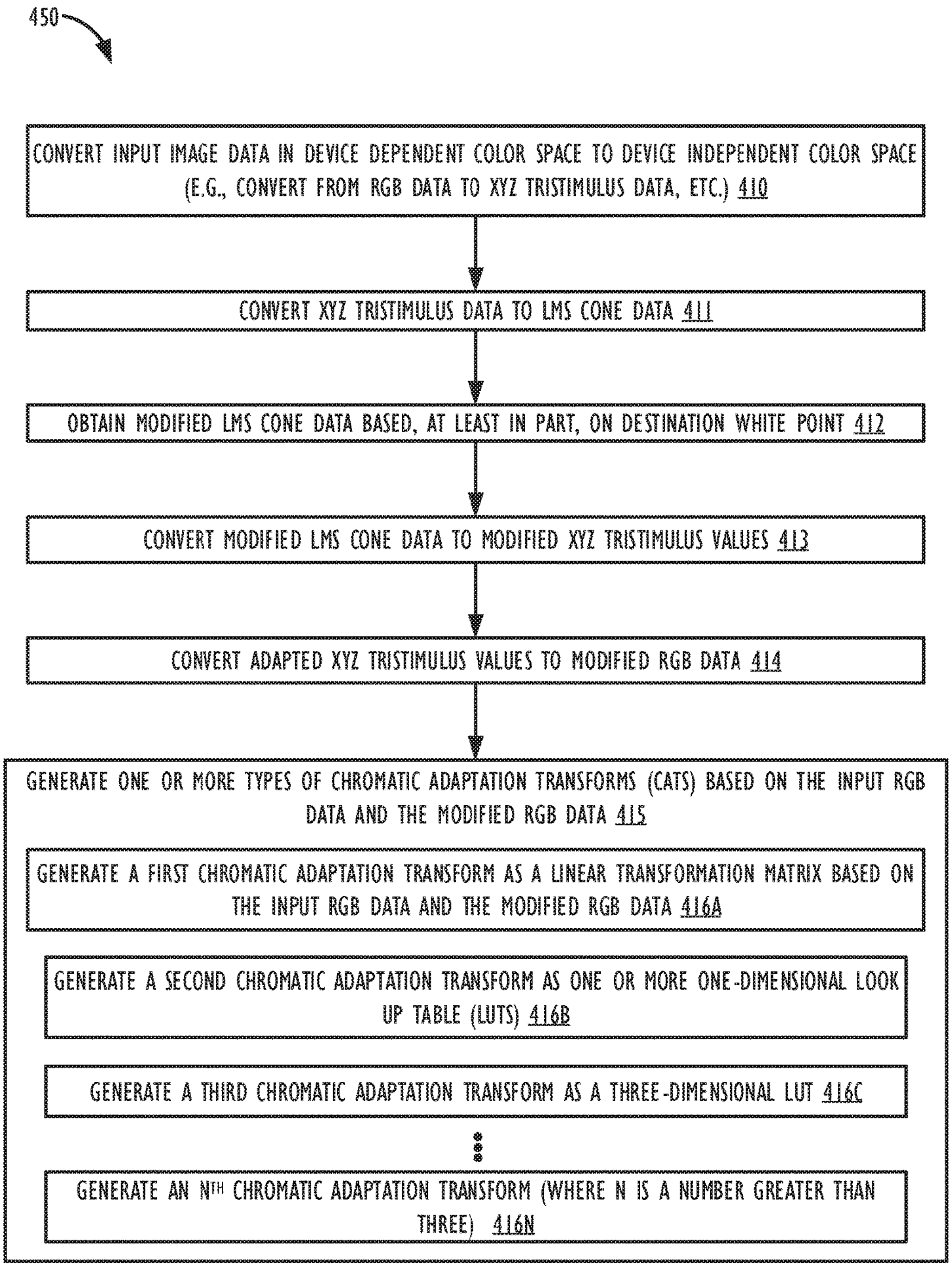
FIGS. 4B, 4C, and 4D are flowcharts illustrating details about the SCA technique of FIG. 4A.

Referring now to FIG. 4B, which illustrates a flowchart for a process 450 of generating one or more CATs. FIG. 4B provides details about the block 406 of the process 400 shown in FIG. 4A. The process 450 may be performed by the SCA logic/module 150 described above in connection with FIG. 1 and/or the SCA service described above in connection with FIG. 2. For brevity, the process 450 will be described herein as being performed by the SCA logic/module 150.

The process 450 begins at a block 410. Here, the SCA logic/module 150 converts the received input image data that is represented in a device dependent color space into a device independent color space. For example, received input RGB data is converted to XYZ tristimulus data. For brevity, an example of the converted input image data as XYZ tristimulus data is used to describe the embodiments herein. It is to be appreciated that the input image data may be converted from a device dependent color space to any device independent color space (e.g., the xyY color space, the uvl color space, the u'v'L color space, the L*a*b* color space, the L*ch color space, the sRGB color space, etc.). Converting the input RGB data into XYZ tristimulus data can be performed using any known technique. For example, a transformation matrix, such as a standard three-by-three conversion matrix.

The process 450 moves on to a block 411. Here, the SCA logic/module 150 may convert the XYZ tristimulus data to LMS cone data using any suitable transformation technique (e.g., a standard Bradford conversion matrix, a chromatic adaptation matrix from the CIECAM02 color appearance model, or other suitable conversion matrix). The LMS color space is represented by the response of the three types of cones in the human eye. A first type of cone is sensitive to longer wavelengths of light, a second type of cone is sensitive to medium wavelengths of light, and a third type of cone is sensitive to shorter wavelengths of light. When the human visual system processes a color image, the image is registered by the long, medium, and short cone photoreceptors in the eye. The neural representation of the image can be represented by three distinct image planes. Converting the XYZ tristimulus data to LMS cone data enables the SCA logic/module 150 to classify and compensate for the effects of ambient light on each image plane separately.

The process 450 further includes a block 412, where the SCA logic/module 150 may determine an adapted destination white point and may apply the adapted destination white point to the LMS cone signals using the following equation:

$$\begin{bmatrix} (C_L \times L) \\ (C_M \times M) \\ (C_S \times S) \end{bmatrix} = \begin{bmatrix} L' \\ M' \\ S' \end{bmatrix},$$

where $C_L$, $C_M$, and $C_S$ represent the adapted destination white point in the LMS color space, where L, M, and S represent the input pixel values in the LMS color space, and where L', M', and S' represent the output pixel values in the LMS color space.

Process 450 also includes block 413, where the SCA logic/module 150 converts the adapted LMS cone data (i.e., the L'M'S' values shown above) to adapted XYZ tristimulus values. If desired, block 412 may include the SCA logic/module 150 performing a contrast compensation operation in which the reflectance of ambient light is subtracted from the adapted XYZ tristimulus data. One technique of such an operation is found in U.S. Pat. No. 9,478,157.

Next, at block 414, the SCA logic/module 150 may convert the adapted XYZ tristimulus values to modified RGB values using an inverse of the operations described above in block 410 (e.g., the inverse of the conversion matrix used to convert RGB pixel data to XYZ tristimulus data).

For one embodiment, the process 450 includes block 415. At this block, the SCA logic/module 150 may generate one or more chromatic adaptation transforms (CATs) based on the input RGB data and the modified RGB data. For one embodiment, and as shown in FIG. 4B, block 415 includes the SCA logic/module 150 generating multiple types of chromatic adaptation transforms (CATs) based on the input RGB data and the modified RGB data. For example, and as shown in FIG. 4B, the block 415 includes blocks 416A-N. Each of these blocks 416A-N is directed to generating a CAT that differs from each of the other blocks 416A-N. It is to be appreciated that generating a first type of CAT may enable generation of other types of CATs. For example, generating a first CAT as a matrix may enable generation of a second CAT as an LUT. It is also to be appreciated that generating the different types of CATs may be performed sequentially or in parallel. For example, a first CAT may be generated as a matrix before generation of second and third CATs as LUTs, where the second and third CATs are generated in parallel.

As alluded to above, the process 450 may include block 416A. Here, the SCA logic/module 150 may generate a first CAT as a linear transformation matrix based on the input RGB data and the modified RGB data. The linear transformation matrix may be a three-by-three matrix. For one embodiment, the linear transformation matrix is further used to generate a set of scalar gains to be applied to the input RGB data for generating the modified RGB data. For example, three scalar magnitude gains can be generated from a three-by-three matrix, where each of the gains corresponds to a respective one of the RGB components (i.e., a first gain for the R channel, a second gain for the G channel, and a third gain for the B channel). For this example, the scalar magnitude gains may be represented in a three-by-one matrix. For another example, each scalar magnitude gain is represented in a 1D LUT. For yet another example, the scalar magnitude gains may be represented in an identity matrix with a diagonal multiplied by the scalar magnitude gains. Scaling, as described in connection with the block 416A, is preferably performed in linear space, but may also be performed in non-linear spaces by encoding the scale factor in the color space's transfer function. Scaling that is based one or more embodiments of SCA described herein provides adequate results for gray color values and relatively less adequate results for non-gray color values.

With regard to SCA performed using a linear transformation matrix (e.g., a three-by-three matrix, etc.), such a matrix may be more beneficial than multiplication of the scalar magnitude gains with the input RGB data using, for example, a three-by-one matrix. This is because a linear transformation matrix may be used to encode a more sophisticated SCA technique than that provided by a scalar magnitude gain. Consequently, the linear transformation matrix can assist with managing colors beyond grays by converting from the input RGB data to a perceptual color space and performing the scaling in that color space. For one embodiment, a linear transformation matrix can be used for SCA in the following manner: (i) convert the input RGB data to XYZ tristimulus data (e.g., as described in block 410, etc.); (ii) generate an identity matrix scaled by the ratio of the XYZ tristimulus data and the adapted XYZ tristimulus data; (iii) multiply the XYZ tristimulus data by the identity matrix; and (iv) convert from the product of the XYZ tristimulus data and the identity matrix to the modified RGB data. The immediately preceding embodiment can be modified based on, for example, the Bradford chromatic adaptation technique. An SCA operation performed using a linear transformation matrix can do a relatively better job preserving the perceived hue and saturation of non-gray color values than simple scaling of the input RGB data using the scalar magnitude gains. There is, however, at least one drawback to matrix-based SCA-applying the matrix in the processing circuitry 103 (e.g., CPU(s), GPU(s), etc.) may be relatively more computationally expensive (e.g., requiring many more multiplications and adds, etc.) than scaling based on the scalar gains described above. Another drawback is that multiple electronic components of the electronic device 101 may share computational resources (e.g., hardware, etc.) used for processing matrices, which may have negative effects on SCA performed using a matrix. These negative effects can, for example, include a delay that causes a failure to meet time constraints.

At block 416B, the SCA logic/module 150 may generate a second CAT as one or more 1D LUTs. The initial values of the LUTs may be determined by a color calibration procedure. For example, three 1D LUTs can be created in a linear or gamma space for each of the RGB components using a color calibration procedure. In this way, three 1D LUTs receive the input RGB data as input and return the modified RGB data as output. Even though SCA performed using a linear transformation matrix (e.g., one of those described above in FIGS. 1-4B, etc.) may be relatively more computational inefficient than SCA performed using one or more 1D LUTs, such a matrix generally has relatively fewer coefficients to compute, manage, and update (e.g., as few as 9) while each 1D LUT might have as many as $2^n$ values to compute, manage, and update (where n is the precision of the LUT input). For example, a 1D LUT with a precision of 10 bits will have 1024 values to compute, manage, and update. If the modified RGB data is to be acquired using three 1D LUTs, then there will be 3072 values to compute, manage, and update (i.e., 3072=3 gains×1024 entries/1D LUT). Updating these values can be relative more computationally expensive than updating the values of a matrix.

The process 450 may also include block 416C. Here, the SCA logic/module 150 may generate a third CAT as a 3D LUT. For this embodiment, the 3D LUT may assist with improving control over and precision of the SCA techniques described herein. The initial values of the 3D LUT may be determined by a color calibration procedure and a gamut mapping procedure. For example, a 3D LUT can be created as a three-dimensional cube that allows for determining a given single R, G, or B output value based on a single R, G or B input value change. Use of a 3D LUT may assist with providing sophisticated advantages to the SCA techniques described herein. For example, a 3D LUT can adapt some colors/color-regions differently than others, manage colors that the chromatic adaptation would drive out of the desired color space, etc. A 3D LUT, however, can have a relatively larger size than a matrix or a 1D LUT. The 3D LUT may also have even more values to compute, manage, and update than a matrix or a 1D LUT. In particular, a 3D LUT may have $(b)^3$ values to compute, manage, and update (where b is the number of known input to output points for each axis of the 3D LUT). The 3D LUT also requires some additional computational operations that are not required when working with a matrix or a 1D LUT. For example, an additional interpolation procedure may be required for all RGB values that are not included as explicit values in the 3D LUT. Consequently, and for this example, the complexity and the computational cost of this implementation may be relatively larger than what is required for matrices or 1D LUTs. As an example, one 3D LUT may include $17^3$ known values (i.e., 4913 values) to compute, manage, and update. Furthermore, each of the 4913 values is an anchor point for interpolation. That is, and for this example, when a value is not computed in the 3D LUT, then one or more of the 4913 values is an anchor point for interpolation from its neighboring points to achieve or determine the unknown value. Interpolation can be performed, for example, by a trilinear interpolation technique that includes using the smallest cube from the 3D LUT that contains the color to be interpolated and applying weights to the cube's vertices. Interpolation can also be performed, for example, by a tetrahedral interpolation technique. This includes using four vertices of the smallest tetrahedron (from the 3D LUT) that encloses the color to be interpolated. Interpolation techniques are known, so they are not described again in further detail.

Also, the process 450 may include block 416N. Here, the SCA logic/module generates an $N^{th}$ CAT, where N is number that is greater than three. For one embodiment, the $N^{th}$ CAT differs from each of the first, second, and third CATs described above in connection with blocks 416A-C. For one example, the $N^{th}$ CAT may be a combination of a 1D LUT and a matrix. It is to be appreciated that any known CAT that differs from the first, second, and third CATs described above in connection with blocks 416A-C can be the $N^{th}$ CAT.

Figure 4C:
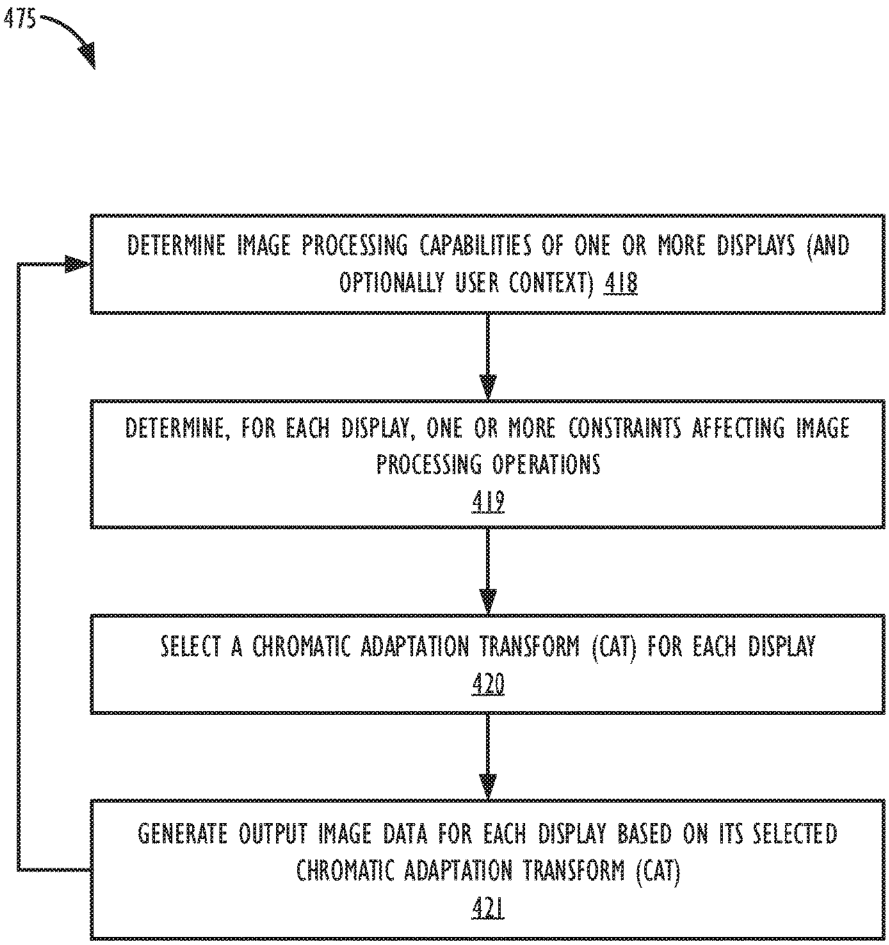

FIG. 4C illustrates a flowchart for a process 475 to generate output image data based on input image data and one or more CATs. FIG. 4C provides details about the block 407 of the process 400 shown in FIG. 4A. The process 475 may be performed by the SCA logic/module 150 described above in connection with FIG. 1 and/or the SCA service described above in connection with FIG. 2. For brevity, the process 475 will be described herein as being performed by the SCA logic/module 150.

Process 475 begins at a block 418. Here, the SCA logic/module 150 determines image processing capabilities of one or more destination displays (and optionally user context information). Process 475 also includes block 419. Here, the SCA logic/module 150 determines, for each destination display, one or more constraints affecting its image processing operations. The image processing capabilities, the user context information, and/or the constraints can be determined in real-time or near real-time, for example, in response to receiving input image data (e.g., a frame to be displayed, etc.). For one embodiment, blocks 418 and 419 are performed according to the description provided in connection with at least FIG. 3.

At blocks 420-421, the SCA logic/module 150 selects a CAT for each destination display and generates output image data for each display based on an application of the selected CAT to the input image data. These selection and generation operations may vary depending on the determined image processing capabilities, the constraints affecting image processing operations, and/or the user context information of blocks 418-419. For one example, if a destination display's associated SCA logic/module 150 is capable of performing a first CAT that includes a three-by-one matrix and a second CAT that includes a 3D LUT, and if the OS is booting up, then the first CAT may be selected as the CAT for the display. This is because, during the booting up stage, the OS's computational resources may be assigned to other OS services that are responsible for ensuring a successful boot up and unavailable for performing the second CAT, which is relatively more computationally expensive than the first CAT. After block 421, which would likely be after the boot up stage is complete, the OS's previously unavailable computational resources may become available. These available resources may, after another iteration of the blocks 418-421, lead the SCA logic/module 150 to select the second CAT, which is relatively more computationally expensive than the first CAT. For another example, if a destination display's SCA logic/module 150 is capable of performing a first CAT that includes a three-by-one matrix and a second CAT comprising one or more 1D LUTs, and if a color difference between the starting white point and the destination white point exceeds a threshold difference, then the second, more computationally expensive CAT may be selected by the display's associated SCA logic/module 150 as the CAT for the display. This is because a large change in the white points (e.g., a difference between a source white point and a destination white point that is equal to or exceeds a threshold difference, a difference between a display's destination white point at a first time and the display's destination white point at a second, later time that is equal to or exceeds a threshold difference, etc.) may require more a precise SCA so as to avoid presenting perceptible artifacts to a user. After block 421, and if the difference drops below the threshold difference, then a relatively less precise SCA may be acceptable because it will lead to fewer or no artifacts that are perceptible to a user of the display. These scenarios may, after another iteration of the blocks 418-421, lead the SCA logic/module 150 to select the first, less computationally expensive CAT. For yet another example, if a destination display is capable of performing a CAT that includes a three-by-one matrix and not one that includes an LUT, then the CAT may be selected as the CAT for the display.

In the immediately preceding examples, at least one CAT is used. It is to be appreciated that any number of CATs may be used but only one CAT is selected for generating output image data on each iteration of process 475. Additional details about transitioning from displaying first output image data to displaying second output image data after two or more iterations of the process 475 is described below in connection with FIG. 4D.

Figure 4D:
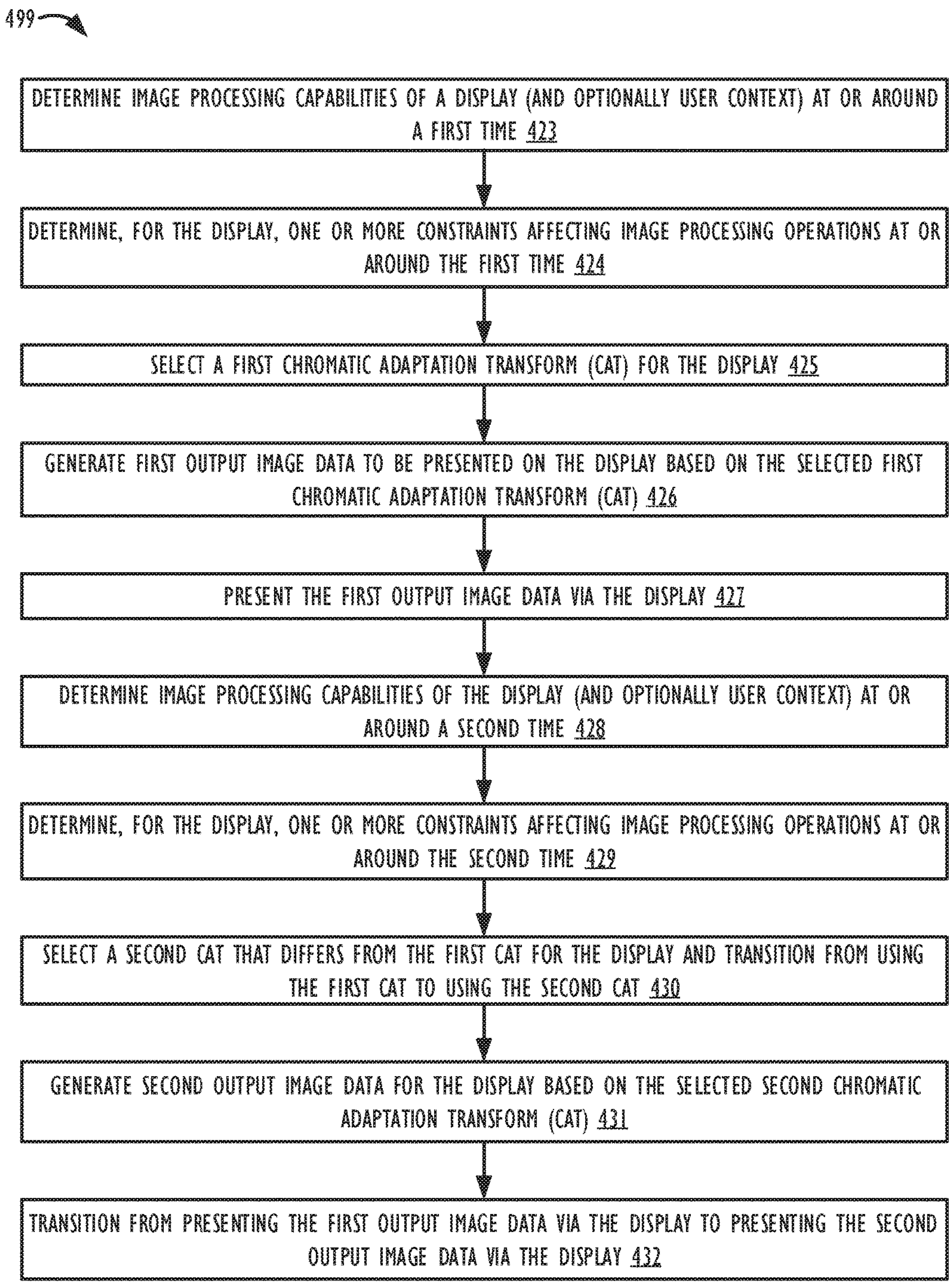

FIG. 4D illustrates one embodiment of a process 499 for transitioning from displaying first output image data to displaying second output image data in a manner that is imperceptible or perceptible but not objectionable to a user viewing the transition. Process 499 includes two iterations of process 475. It is to be appreciated that the description provided below in connection with the process 499 applies to embodiments that include more than just two iterations. The process 499 may be performed by the SCA logic/module 150 described above in connection with FIG. 1 and/or the SCA service described above in connection with FIG. 2. For brevity, the process 499 will be described herein as being performed by the SCA logic/module 150. The process 499 begins at blocks 423 and 424. Here, the SCA logic/module determines image processing capabilities of a destination display, user context information associated with the destination display, and/or one or more constraints affecting the destination display's image processing operations at or around a first time. The image processing capabilities, the user context information, and/or the constraints can be determined in real-time or near real-time, for example, in response to receiving input image data (e.g., a frame to be displayed, etc.). Thus, and for one embodiment, the first time may, for example, be equal to a time at or around receiving input image data (e.g., a frame to be displayed, etc.). For one embodiment, blocks 423 and 424 are performed according to the description provided in connection with at least FIG. 3.

Next, at block 425, the SCA logic/module 150 may select a first chromatic adaptation transform (CAT) for the display. For one embodiment, the SCA logic/module 150 may select the first CAT based on the image processing capabilities, the user context information, and/or the one or more constraints that were determined at or around the first time. The first CAT may, for some embodiments, be selected in accordance with the description provided above in connection with blocks 420-421 of FIG. 4C. For example, a destination display's associated SCA logic/module 150 may determine that it is capable of performing a first CAT that includes a three-by-three matrix and a second CAT that includes three 1D LUTs, and that the display's associated OS is booting up at or around the first time. For this example, the destination display's associated SCA logic/module 150 may select the first CAT as the CAT for the display based on the determinations. This is because, during the booting up stage, the OS's computational resources may be assigned to other OS services that are responsible for ensuring a successful boot up and unavailable for performing the second, more computationally expensive CAT.

The process 400 may also include blocks 426 and 427. Here, the SCA logic/module 150 may generate first output image data based on the selected first CAT and present the first output image data via the display. With specific regard to block 426, the generation of the first output image data is based on processing the input image data using the selected first CAT (e.g., applying the selected first CAT to the input image data to generate the first output image data, etc.). Next, at blocks 428 and 429, the SCA logic/module determines image processing capabilities of the destination display, user context information associated with the destination display, and/or one or more constraints affecting the destination display's image processing operations at or around a second time that is after the first time. The image processing capabilities, the user context information, and/or the constraints can be determined in real-time or near real-time, for example, in response to presenting the first output image data via the display (e.g., a frame being displayed, etc.). Thus, and for one embodiment, the second time may, for example, be equal to a time at or around the presentation of the first output image data via the display (e.g., a frame being displayed, etc.). For one embodiment, blocks 428 and 429 are performed according to the description provided in connection with at least FIG. 3.

The process 499 can include block 430, where the SCA logic/module 150 may select a second CAT that differs from the first CAT for the display and transition from using the first CAT to using the second CAT. For one embodiment, the SCA logic/module 150 may select the second CAT based on the image processing capabilities, the user context information, and/or the one or more constraints that were determined at or around the second time. The second CAT may, for some embodiments, be selected in accordance with the description provided above in connection with blocks 420-421 of FIG. 4C. Using the example provided above in connection with block 425, the destination display's associated SCA logic/module 150 may determine that it is capable of performing a first CAT that includes a three-by-three matrix and a second CAT that includes three 1D LUTs, and that the display's associated OS is no longer booting up at or around the second time (which occurs after the first time). For this example, the destination display's associated SCA logic/module 150 may select the second CAT as the CAT for the display based on the determinations. Here, the OS's computational resources that were previously unavailable at or around the first, earlier time because there may have been assigned to other OS services that are responsible for ensuring a successful boot up are now available for performing the second CAT, which is relatively more computationally expensive than the first CAT. For one embodiment of block 430, transitioning from the first CAT (e.g., a three-by-three matrix, etc.) to the second CAT (e.g., a set of 3 1D LUTs, etc.) may include use of an intermediate CAT (e.g., a matrix, an LUT, a combination thereof, etc.). Using the example described above in connection with block 430, the SCA logic/module 150 may transition from using the first CAT (e.g., the three-by-three matrix, etc.) to using the second CAT (e.g., the set of three 1D LUTs, etc.) in the following way: (i) continue presenting the first output image data that was generated using the first CAT (e.g., the three-by-three matrix, etc.); (ii) generate an intermediate CAT (e.g., a three-by-one matrix comprised of scalar gains, etc.) based on the first CAT (e.g., the three-by-three matrix, etc.); (iii) generate the second CAT (e.g., the set of three 1D LUTs, etc.) using the intermediate CAT (e.g., a three-by-one matrix comprised of scalar gains, etc.) and/or the input image data; and (iv) after generation of the second CAT, unselect the first CAT and select the second CAT. For this example, the set of three 1D LUTs may be generated to provide scaling-based SCA (in linear or gamma space as appropriate).

The process 400 may also include block 431. Here, the SCA logic/module 150 may generate second output image data based on the selected second CAT. Generating the second output image data may be based on processing the input image data using the selected second CAT (e.g., applying the selected second CAT to the input image data to generate the second output image data, etc.). The process 400 may also include block 432, where the SCA logic/module 150 transitions from presenting the first output image data via the display to presenting the second output image data via the display. For some embodiments, each of blocks 428-431 may occur during performance of block 427. For this and other embodiments, the SCA logic/module 150 performs block 432 in manner that is imperceptible or perceptible but not objectionable to a user of the display device. For example, a time duration for gradually or instantaneously transitioning from presenting the first output image via the display to presenting the second output image data via the display is selected such that the transition is imperceptible or perceptible but not objectionable to a user of the display. If the transition is perceptible to a user, it may have a negative impact on the user's experience perceiving the display's output. This is because, when the transition is perceptible, the user may perceive an objectionable flash or strobing light (e.g., pixel values associated with non-gray colors may noticeably change from the values associated with the first output image data to the values associated with the second output image data, etc.). A transition may be undesirably perceptible to a user when the time duration for the transition is too short. For one embodiment of block 432, the time duration for the transition is chosen so that it is not too short. More specifically, the time duration for the transition should match or exceed a threshold time duration. For some embodiments, the threshold time duration is equal to a length of time required for the user to adapt to the changing pixel values of non-gray colors under different ambient light conditions. The threshold time duration can be determined using, for example, a temporal filter as described above in connection with block 408 of FIG. 4A.

For one embodiment of block 432, the transition is also based on a temporal update rate. As explained above, transitioning from presenting the first output image data (that is generated based on the first CAT and the input data) to presenting the second output image data (that is generated based on the second CAT and the input data) is performed over the course of the transition's time duration. Furthermore, the transition is performed via a set of discrete operations. Each of these operations should be designed such that its result or performance is imperceptibly different from the previous operation's result/performance otherwise the transition will become perceptible to a user of the display. The rate at which each operation from the set of discrete operations used to effectuate the transition is performed is referred to herein as the temporal update rate. To determine the temporal update rate, the SCA logic/module 150 may determine the largest difference in corresponding white points of the first and second output image data that results from two sequential operations and set the determined difference as a just noticeable difference (JND) threshold that the temporal update rate may not exceed. That is, the largest difference in corresponding white points of the first and second output image data that results from two sequential operations has a color difference that is less than or equal to a JND threshold. Thus, each of the operations used to effectuate the transition is required to create a difference in corresponding white points that is less than or equal to the JND threshold. In this way, each of the operations used to effectuate the transition may be performed in a manner that is imperceptible or perceptible but not objectionable to a user. For one embodiment of the block 432, the temporal update rate for the transition is based on or tied to a color difference between the display's destination white point at or around the first time and the display's destination white point at or around the second time. When this color difference meets or exceeds a predetermined JND threshold (e.g., 1 delta E, 1.5 delta E, any value of delta E, etc.), the time duration for the transition may be increased to avoid creating a situation where the user perceives the transition. Suitable time durations and temporal update rates may be determined based on empirical or theoretical studies performed a priori at an earlier stage.

For another embodiment of the block 432, the time duration and the temporal update rate of the transition are based on the actual content being displayed during the transition. For example, the time duration and temporal update rate associated with a transition may be relatively shorter/smaller when the first and second output image data comprises mainly pixel values for gray colors than when the first and second output image data comprises mainly pixel values for non-gray colors.

For example, and for one embodiment of block 432, transitioning from displaying the first output image data that is generated using a first CAT (e.g., a three-by-three matrix, etc.) and input image data to displaying the second output image data that is generated using a second CAT (e.g., a set of 3 1D LUTs, etc.) and the input image data may include displaying intermediate output image data that is generated using an intermediate CAT (e.g., a three-by-one matrix, etc.) and the input image data. For this example, the SCA logic/module 150 may perform the transition in the following way: (i) continue presenting the first output image data via a display; (ii) generate an intermediate CAT (e.g., a three-by-one matrix comprised of scalar gains, etc.) based on the first CAT (e.g., the three-by-three matrix, etc.); (iii) generate intermediate output image data using the intermediate CAT (e.g., a three-by-one matrix comprised of scalar gains, etc.) and the input image data; (iv) present the intermediate image data via the display; (v) generate the second CAT (e.g., the set of three 1D LUTs, etc.) using the intermediate CAT (e.g., a three-by-one matrix comprised of scalar gains, etc.) and/or the input image data; (vi) after generation of the second CAT, unselect the first CAT and select the second CAT; (vii) generate the second output image data using the second CAT and the input image data; and (viii) present the second output image data via the display. As shown in this example, the transition from presenting the first output image data to presenting the second output image data comprises at least eight operations. Here, a threshold time duration is equal to a length of time required for the user to adapt to the changing pixel values of non-gray colors under different ambient light conditions. This may determined by applying the applying a temporal filter to the first and second output image data. Also, the JND threshold may be determined by determining the largest difference in corresponding white points of the first and second output image data that results from two sequential operations and setting the determined difference as the JND threshold that the temporal update rate may not exceed. Thus, for this example, the transition includes a time duration for its eight operations that is equal to or greater than the threshold time duration. The transition also includes a temporal update rate for each of its eight operations that is less than or equal to the JND threshold. In this way, the transition may be performed in a manner that is imperceptible or perceptible but not objectionable to a user.

Figure 5:
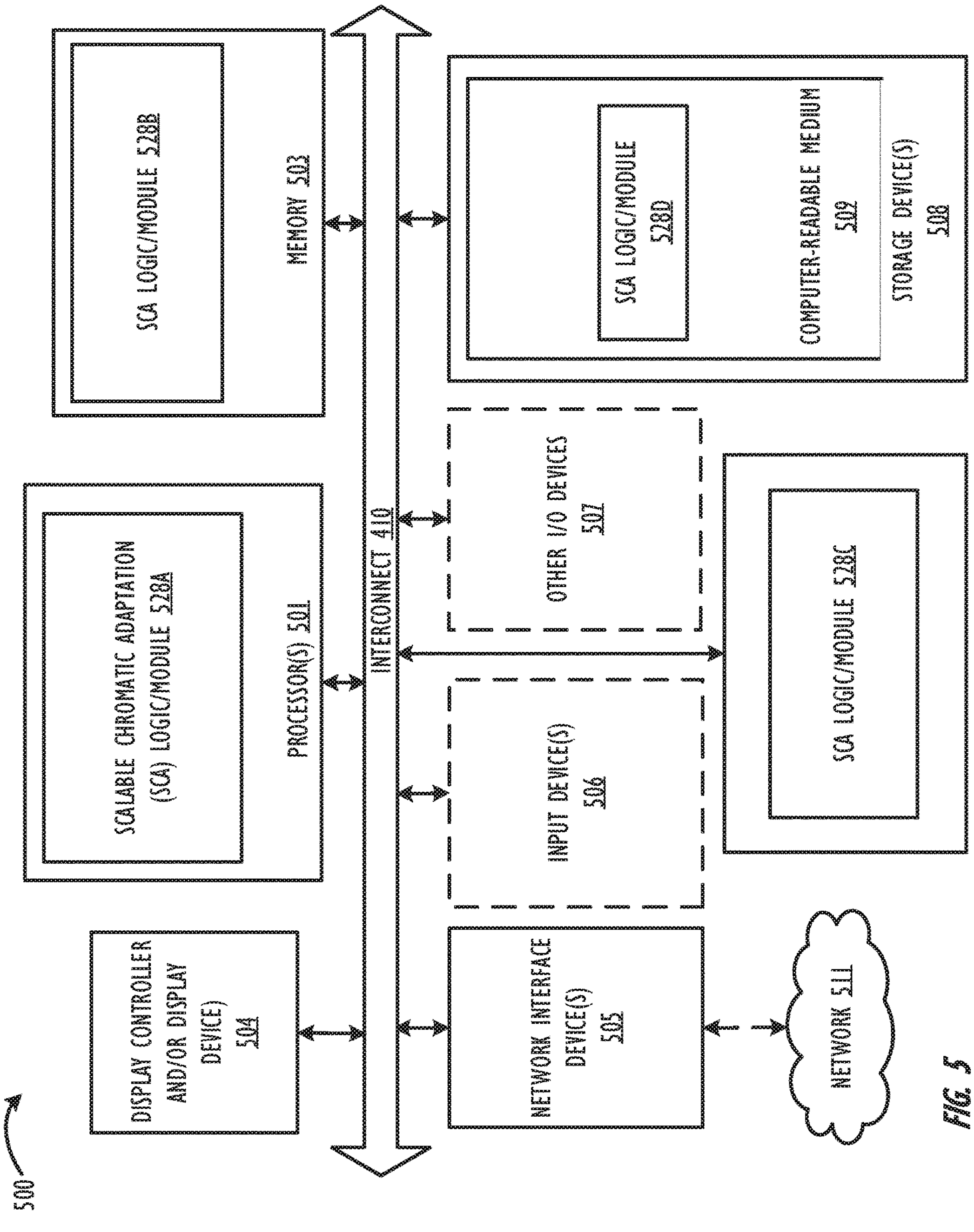
FIG. 5 illustrates an exemplary processing system that can assist with performing one or more embodiments of an SCA technique.

FIG. 5 is a block diagram illustrating an example data processing system 500 that may be used with one embodiment. For example, the system 500 may represent any of the data processing systems or electronic devices described above performing any of the processes or methods described above in connection with at least one of FIG. 1, 2, 3, or 4A-4D.

System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. Nevertheless, it is to be understood that additional components may be present in certain implementations and furthermore, different arrangement of the components shown may occur in other implementations. System 500 may represent a desktop, a wearable device, an IoT device, a vehicle, a laptop, a tablet, a server, a mobile phone, a media player, a personal digital assistant (PDA), a personal communicator, a gaming device, a set-top box, or a combination thereof. Further, while only a single machine or system is illustrated, the term "machine" or "system" shall also be taken to include any collection of machines or systems that individually or jointly execute at least one set of instructions to perform any of the methodologies discussed herein.

For one embodiment, system 500 includes processor(s) 501, memory 503, and devices 505-508 via a bus or an interconnect 510. Processor(s) 501 may represent a single processor or multiple processors with a single processor core or multiple processor cores included therein. Processor(s) 501 may represent one or more general-purpose processors such as a microprocessor, a central processing unit (CPU), or the like. More particularly, processor(s) 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor(s) 501 may also be one or more special-purpose processors such as an application specific integrated circuit (ASIC), an Application-specific instruction set processor (ASIP), a cellular or baseband processor, a field programmable gate array (FPGA), a digital signal processor (DSP), a graphics processor, a graphics processing unit (GPU), a network processor, a communications processor, a cryptographic processor, a co-processor, an embedded processor, a floating-point unit (FPU), or any other type of logic capable of processing instructions.

Processor(s) 501, which may be a low power multi-core processor socket such as an ultra-low voltage processor, may act as a main processing unit and central hub for communication with the various components of the system. Such processor can be implemented as a system-on-chip (SoC) IC. An SCA logic/module 528A may reside, completely or at least partially, within processor(s) 501. Furthermore, the processor(s) 501 may be configured to execute instructions for performing the operations and methodologies discussed herein—for example, any of the processes or methods described above in connection with at least one of FIG. 1, 2, 3, or 4A-4D. System 500 may further include a graphics interface that communicates with a graphics subsystem 504, which may include a display controller, at least one GPU, and/or a display device. For one embodiment, the processor(s) 501 includes an SCA logic/module 528A, which enables processor(s) 501 to perform any, all, or some of the processes or methods described above in connection with at least one of FIG. 1, 2, 3, or 4A-4D.

Processor(s) 501 may communicate with memory 503, which in one embodiment can be implemented via multiple memory devices to provide for a given amount of system memory. Memory 503 may include one or more volatile storage (or memory) devices such as random access memory (RAM), dynamic RAM (DRAM), synchronous DRAM (SDRAM), static RAM (SRAM), or other types of storage devices. Memory 503 may store information including sequences of instructions that are executed by processor(s) 501 or any other device. For example, executable code and/or data of a variety of operating systems, device drivers, firmware (e.g., input output basic system or BIOS), and/or applications can be loaded in memory 403 and executed by processor(s) 501. An operating system can be any kind of operating system. An SCA logic/module 528B may also reside, completely or at least partially, within memory 503. For one embodiment, the memory 503 includes the SCA logic/module 528B as instructions. When the processor 501 executes the instructions represented by the SCA logic/module 528B, the instructions 528B cause the processor(s) 501 to perform any, all, or some of the processes or methods described above in connection with at least one of FIG. 1, 2, 3, or 4A-4D.

System 400 may further include I/O devices such as devices 505-508, including network interface device(s) 505, optional input device(s) 506, and other optional I/O device(s) 507. Network interface device 505 may include a wireless transceiver and/or a network interface card (NIC). The wireless transceiver may be a Wi-Fi transceiver, an infrared transceiver, a Bluetooth transceiver, a WiMAX transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with display device 504), a pointer device such as a stylus, and/or a keyboard (e.g., physical keyboard or a virtual keyboard displayed as part of a touch sensitive screen). For example, input device 506 may include a touch screen controller coupled to a touch screen. The touch screen and touch screen controller can, for example, detect contact and movement or a break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

I/O devices 507 may include an audio device. An audio device may include a speaker and/or a microphone to facilitate voice-enabled functions, such as voice recognition, voice replication, digital recording, and/or telephony functions. Other I/O devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), depending upon the specific configuration or design of system 500.

To provide for persistent storage of information such as data, applications, one or more operating systems and so forth, a mass storage (not shown) may also couple to processor(s) 501. For various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. In addition, a flash device may be coupled to processor(s) 501, e.g., via a serial optional peripheral interface (SPI). This flash device may provide for non-volatile storage of system software, including a basic input/output software (BIOS) and other firmware.

Furthermore, an SCA logic/module 528C may be a specialized stand-alone computing device that is formed from hardware, software, or a combination thereof. For one embodiment, the SCA logic/module 528C performs any, all, or some of the processes or methods described above in connection with at least one of FIG. 1, 2, 3, or 4A-4D.

Storage device 508 may include computer-accessible storage medium 509 (also known as a machine-readable storage medium or a computer-readable medium) on which is stored one or more sets of instructions or software (e.g., the SCA logic/module 528D) embodying one or more of the methodologies or functions described above in connection with FIG. 1, 2, 3, or 4A-4D. For one embodiment, the storage device 408 includes the SCA logic/module 528D as instructions. When the processor 501 executes the instructions, the instructions 528D cause the processor 401 to perform any, all, or some of the processes or methods described above in connection with at least one of FIG. 1, 2, 3, or 4A-4 C. One or more of logic/modules 528A-D may be transmitted or received over a network 511 via network interface device 505.

Computer-readable storage medium 509 can store some or all of the software functionalities of the SCA logic/module 528D described above persistently. While computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Note that while system 500 is illustrated with various components of a data processing system, it is not intended to represent any particular architecture or manner of interconnecting the components; as such, details are not germane to the embodiments described herein. It will also be appreciated that network computers, handheld computers, mobile phones, servers, and/or other data processing systems, which have fewer components or perhaps more components, may also be used with the embodiments described herein. Examples of such data systems are the electronic device 101 of FIG. 1.

Description of at least one of the embodiments set forth herein is made with reference to figures. However, certain embodiments may be practiced without one or more of these specific details, or in combination with other known methods and configurations. In the following description, numerous specific details are set forth, such as specific configurations, dimensions and processes, etc., in order to provide a thorough understanding of the embodiments. In other instances, well-known processes and manufacturing techniques have not been described in particular detail in order to not unnecessarily obscure the embodiments. Reference throughout this specification to "one embodiment," "an embodiment," "another embodiment," "other embodiments," "some embodiments," and their variations means that a particular feature, structure, configuration, or characteristic described in connection with the embodiment is included in at least one embodiment. Thus, the appearances of the phrase "for one embodiment," "for an embodiment," "for another embodiment," "in other embodiments," "in some embodiments," or their variations in various places throughout this specification are not necessarily referring to the same embodiment. Furthermore, the particular features, structures, configurations, or characteristics may be combined in any suitable manner in one or more embodiments.

In the following description and claims, the terms "coupled" and "connected," along with their derivatives, may be used. It should be understood that these terms are not intended as synonyms for each other. "Coupled" is used to indicate that two or more elements or components, which may or may not be in direct physical or electrical contact with each other, co-operate or interact with each other. "Connected" is used to indicate the establishment of communication between two or more elements or components that are coupled with each other.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

Although the processes or methods (e.g., in FIGS. 1, 2, 3, 4A-4D, etc.) are described above in terms of some sequential operations, it should be appreciated that some of the operations described may be performed in a different order. Moreover, some operations in the processes or methods described above (e.g., in FIGS. 1, 2, 3, 4A-4D, etc.) may be performed in parallel rather than sequentially. Additionally, some of the operations in the processes or methods described above (e.g., in FIGS. 1, 2, 3, 4A-4D, etc.) may be omitted altogether depending on the implementation.

Embodiments described herein are not described with reference to any particular programming language. It will be appreciated that a variety of programming languages may be used to implement the teachings of embodiments of the invention as described herein. In utilizing the various aspects of the embodiments described herein, it would become apparent to one skilled in the art that combinations, modifications, or variations of the above embodiments are possible for managing components of processing system to increase the power and performance of at least one of those components. Thus, it will be evident that various modifications may be made thereto without departing from the broader spirit and scope of at least one of the inventive concepts set forth in the following claims. The specification and drawings are, accordingly, to be regarded in an illustrative sense rather than a restrictive sense.

In the development of any actual implementation of one or more of the inventive concepts set forth in the embodiments described herein (e.g., as a software and/or hardware development project, etc.), numerous decisions must be made to achieve the developers' specific goals (e.g., compliance with system-related constraints and/or business-related constraints). These goals may vary from one implementation to another, and this variation could affect the actual implementation of one or more of the inventive concepts set forth in the embodiments described herein. Furthermore, such development efforts might be complex and time-consuming, but would nevertheless be a routine undertaking for a person having ordinary skill in the art in the design and/or implementation of one or more of the inventive concepts set forth in the embodiments described herein.

As used herein, the phrase "at least one of A, B, or C" includes A alone, B alone, C alone, a combination of A and B, a combination of B and C, a combination of A and C, and a combination of A, B, and C. In other words, the phrase "at least one of A, B, or C" means A, B, C, or any combination thereof such that one or more of a group of elements consisting of A, B and C, and should not be interpreted as requiring at least one of each of the listed elements A, B and C, regardless of whether A, B and C are related as categories or otherwise. Furthermore, the use of the article "a" or "the" in introducing an element should not be interpreted as being exclusive of a plurality of elements. Also, the recitation of "A, B and/or C" is equal to "at least one of A, B or C."

What is claimed is:

1. A computer implemented method for displaying image data on a display device, comprising:

operating an ambient light sensor to receive ambient light color information;

receiving, with one or more processors, input image data to be presented via a display device coincident with the received ambient light color information, the display device having a first white point at a time prior to receiving the input image data;

determining, with the one or more processors, a second white point for the display device in response to the received input image data and the ambient light color information, wherein the first and second white points are different from each other;

generating, with the one or more processors, a plurality of chromatic adaptation transforms (CATs) based on the first and second white points, wherein the plurality of CATs are different from each other and are stored in a memory;

determining, with the one or more processors, an image processing capability associated with the display device;

determining, with the one or more processors, a constraint affecting image processing operations performed for the display device;

generating, with the one or more processors, output image data by accessing one or more of the plurality of CATs in the memory and applying the accessed one or more CATs to the input image data; and displaying the output image data on the display device.

2. The computer implemented method of claim 1, further comprising:

selecting, with the one or more processors and based on the determined image processing capability and the determined constraint, one CAT from a group consisting of the plurality of CATs.

3. The computer implemented method of claim 1, wherein the constraint comprises one or more of:

an availability of computational resources for performing image processing operations for the display device, an amount of computational resources required to perform image processing operations for the display device, a timing constraint associated with displaying data on the display device or performing image processing operations for the display device, and a desired or an acceptable accuracy of image processing results.

4. The computer implemented method of claim 1, wherein the image processing capability comprises a capability of an associated circuitry of the display device to process one or more of a matrix and an LUT.

5. The computer implemented method of claim 1, wherein generating output image data further comprises:

applying, with the one or more processors, a temporal filter to the output image data.

6. A non-transitory computer readable medium comprising instructions, which when executed by one or more processors, cause the one or more processors to:

operate an ambient light sensor to receive ambient light color information;

receive input image data to be presented via a display device coincident with the received ambient light color information, the display device having a first white point at a time prior to receiving the input image data;

determine a second white point for the display device in response to the received input image data and the ambient light color information, wherein the first and second white points are different from each other;

generate a plurality of Chromatic adaptation transforms (CATs) based on the first and second white points, wherein the plurality of CATs are different from each other and are stored in a memory;

determine an image processing capability associated with the display device;

determine a constraint affecting image processing operations performed for the display device;

generate output image data by accessing one or more of the plurality of CATs in the memory and applying the accessed one or more CATs to the input image data; and display the output image data on the display device.

7. The non-transitory computer readable medium of claim 6, wherein the instructions comprise additional instructions for causing the one or more processors to:

select, based on the determined image processing capability and the determined constraint, one CAT from a group consisting of the plurality of CATs.

8. The non-transitory computer readable medium of claim 6, wherein the constraint comprises one or more of:

an availability of computational resources for performing image processing operations for the display device, an amount of computational resources required to perform image processing operations for the display device, a timing constraint associated with displaying data on the display device or performing image processing operations for the display device, and a desired or an acceptable accuracy of image processing results.

9. The non-transitory computer readable medium of claim 6, wherein the image processing capability comprises a capability of an associated circuitry of the display device to process one or more of a matrix and an LUT.

10. The non-transitory computer readable medium of claim 6, wherein the instructions for causing the one or more processors to generate output image data comprise instructions for causing the one or more processors to:

apply a temporal filter to the output image data.

11. A computer implemented system for displaying image data on a display device, comprising:

a display device configured to display image data;

one or more ambient light sensors coupled to the display device, the one or more sensors configured to capture ambient light color information associated with the display device;

memory coupled to the display device and the one or more sensors, the memory comprising data and the data comprising instructions; and one or more processors coupled to the display device, the one or more sensors, and the memory, wherein the one or more processors are configured to execute the instructions to:

operate the one or more ambient light sensors to receive the ambient light color information;

receive input image data for display on the display device coincident with the received ambient light color information, the display device having a first white point at a time prior to receiving the input image data;

determine a second white point for the display device in response to the received input image data and the ambient light color information, wherein the first and second white points are different from each other;

generate a plurality of chromatic adaptation transforms (CATs) based on the first and second white points, wherein the plurality of CATs are different from each other and are stored in the memory;

determine an image processing capability associated with the display device;

determine a constraint affecting image processing operations performed for the display device;

generate output image data by accessing one or more of the plurality of CATs in the memory and applying the accessed one or more CATs to the input image data; and displaying the output image data on the display device.

12. The computer implemented system of claim 11, wherein the instructions comprise additional instructions and wherein the one or more processors are configured to execute the additional instructions to:

select, based on the determined image processing capability and the determined constraint, one CAT from a group consisting of the plurality of CATs.

13. The computer implemented system of claim 11, wherein the constraint comprises one or more of:

an availability of computational resources for performing image processing operations for the display device, an amount of computational resources required to perform image processing operations for the display device, a timing constraint associated with displaying data on the display device or performing image processing operations for the display device, and a desired or an acceptable accuracy of image processing results.

14. The computer implemented system of claim 11, wherein the image processing capability comprises a capability of an associated circuitry of the display device to process one or more of a matrix and an LUT.

15. The computer implemented system of claim 11, wherein the one or more processors being configured to execute the instructions to generate output image data comprises the one or more processors being further configured to execute the instructions to:

apply a temporal filter to the output image data.

16. A computer implemented method for displaying image data on a display device, comprising:

generating, with one or more processors, first output image data by accessing a first chromatic adaptive transform (CAT) from a memory and applying the first CAT to input image data, the first CAT being selected from a plurality of CATs based on determining a first image processing capability associated with a display device and a first constraint affecting image processing operations performed for the display device at or around a first time;

displaying the first output image data via the display device;

generating, with the one or more processors, second output image data by accessing from the memory a second CAT that differs from the first CAT and applying the second CAT to the input image data, the second CAT being selected from the plurality of CATs based on determining a second image processing capability associated with the display device and a second constraint affecting the image processing operations performed for the display device at or around a second time that is after the first time; and transitioning, with the one or more processors, from displaying the first output image data via the display device to displaying the second output image data via the display device.

17. The computer implemented method of claim 16, wherein a characteristic of the transition comprises one or more of:

a time duration of the transition that is equal to or greater than a threshold time difference; and a temporal update rate of the transition that is less than or equal to a just noticeable difference threshold.

18. The computer implemented method of claim 17, wherein the transition comprises:

generating intermediate output image data using an intermediate CAT and the input image data, the intermediate CAT being determined based on the first CAT;

displaying the intermediate image data via the display device;

generating the second output image data using the second CAT and the input image data, the second CAT being generated based on the intermediate image data; and displaying the second output image data via the display device.

19. A non-transitory computer readable medium comprising instructions, which when executed by one or more processors, cause the one or more processors to:

generate first output image data by accessing a first chromatic adaptive transform (CAT) from a memory and applying the first CAT to input image data, the first CAT being selected from a plurality of CATs based on determining a first image processing capability associated with a display device and a first constraint affecting image processing operations performed for the display device at or around a first time;

display the first output image data via the display device;

generate second output image data by accessing from the memory a second CAT that differs from the first CAT and by applying the second CAT to the input image data, the second CAT being selected from the plurality of CATs based on determining a second image processing capability associated with the display device and a second constraint affecting the image processing operations performed for the display device at or around a second time that is after the first time; and transition from displaying the first output image data via the display device to displaying the second output image data via the display device.

20. The non-transitory computer readable medium of claim 19, wherein a characteristic of the transition comprises one or more of:

a time duration of the transition that is equal to or greater than a threshold time difference; and a temporal update rate of the transition that is less than or equal to a just noticeable difference threshold.

21. The non-transitory computer readable medium of claim 20, wherein the instructions for causing the one or more processors to transition comprise instructions for causing the one or more processors to:

generate intermediate output image data using an intermediate CAT and the input image data, the intermediate CAT being determined based on the first CAT;

display the intermediate image data via the display device;

generate the second output image data using the second CAT and the input image data, the second CAT being generated based on the intermediate image data; and display the second output image data via the display device.

22. A computer implemented system for displaying image data on a display device, comprising:

a display device configured to display image data;

one or more ambient light sensors coupled to the display, the one or more sensors configured to capture ambient light color information associated with the display device;

memory coupled to the display and the one or more sensors, the memory comprising data and the data comprising instructions and input image data; and one or more processors coupled to the display device, the one or more sensors, and the memory, wherein the one or more processors are configured to execute the instructions to:

generate first output image data by accessing a first chromatic adaptive transform (CAT) from a memory and applying the first CAT to the input image data, the first CAT being selected from a plurality of CATs based on determining a first image processing capability associated with the display device and a first constraint affecting image processing operations performed for the display device at or around a first time;

display the first output image data via the display device;

generate second output image data by accessing from the memory a second CAT that differs from the first CAT and applying the second CAT to the input image data, the second CAT being selected from the plurality of CATs based on determining a second image processing capability associated with the display device and a second constraint affecting the image processing operations performed for the display device at or around a second time that is after the first time; and transition from displaying the first output image data via the display device to displaying the second output image data via the display device.

23. The computer implemented system of claim 22, wherein a characteristic of the transition comprises one or more of:

a time duration of the transition that is equal to or greater than a threshold time difference; and a temporal update rate of the transition that is less than or equal to a just noticeable difference threshold.

24. The computer implemented system of claim 23, wherein the one or more processors being configured to execute the instructions to transition comprises the one or more processors being configured to execute the instructions to:

generate intermediate output image data using an intermediate CAT and the input image data, the intermediate CAT being determined based on the first CAT;

display the intermediate image data via the display device;

generate the second output image data using the second CAT and the input image data, the second CAT being generated based on the intermediate image data; and display the second output image data via the display device.

* * * * *